US010043420B1

(12) United States Patent
Catsaros

(10) Patent No.: US 10,043,420 B1
(45) Date of Patent: Aug. 7, 2018

(54) SCREWLESS SYSTEM FOR SUPPORTING ARTICLES

(71) Applicant: Aldo Catsaros, Bohemia, NY (US)

(72) Inventor: Aldo Catsaros, Bohemia, NY (US)

( * ) Notice: Subject to any disclaimer, the term of this patent is extended or adjusted under 35 U.S.C. 154(b) by 0 days.

(21) Appl. No.: 15/669,774

(22) Filed: Aug. 4, 2017

Related U.S. Application Data

(60) Provisional application No. 62/370,988, filed on Aug. 4, 2016.

(51) Int. Cl.
*A01K 97/10* (2006.01)
*G09F 7/18* (2006.01)
*G09F 17/00* (2006.01)
*F16M 13/02* (2006.01)

(52) U.S. Cl.
CPC ............. *G09F 7/18* (2013.01); *F16M 13/022* (2013.01); *G09F 17/00* (2013.01); *G09F 2007/1804* (2013.01)

(58) Field of Classification Search
CPC ............ G09F 17/00; G09F 2007/1804; F16M 13/022
USPC ............. 248/107, 153, 175, 219.2, 302, 535
See application file for complete search history.

(56) References Cited

U.S. PATENT DOCUMENTS

| | | | | |
|---|---|---|---|---|
| 178,012 A | * | 5/1876 | Koelsch | |
| 1,836,405 A | * | 12/1931 | Siemann | B60R 13/00 248/302 |
| 1,898,781 A | * | 2/1933 | Leiter | A61F 5/04 248/214 |
| 2,517,937 A | * | 8/1950 | Stanton | A01K 97/10 248/156 |
| D179,234 S | * | 11/1956 | Aden | 248/107 |
| 3,749,346 A | * | 7/1973 | Cherniak | F16B 2/248 248/302 |
| 3,883,934 A | * | 5/1975 | Rochfort | F16B 2/248 248/302 |
| 7,175,147 B1 | * | 2/2007 | Marks | B65D 55/16 211/74 |
| 2002/0000504 A1 | * | 1/2002 | Bayne | F21V 21/088 248/302 |
| 2012/0228455 A1 | * | 9/2012 | Fuhrmann | H02G 3/14 248/302 |

* cited by examiner

*Primary Examiner* — Gwendolyn W Baxter
(74) *Attorney, Agent, or Firm* — Antonio Papageorgiou, Esq; Meister Seelig & Fein LLP

(57) ABSTRACT

A support system is provided that includes: a tubular receiving member; first and second intermediate braces extending outward from a bottom end of the tubular receiving member in different directions in a first plane; a first vertical support extending from the first intermediate brace in a direction essentially orthogonal to the first plane; a second vertical support extending from the second intermediate brace in a direction essentially orthogonal to the first plane and opposite the first intermediate brace; an upper brace extending from the first vertical support; and a lower brace extending from the second vertical support, each of the braces in a second plane essentially parallel to the first plane and forming a hooks with opening in opposite directions from each other.

9 Claims, 6 Drawing Sheets

SCREWLESS SYSTEM FOR SUPPORTING ARTICLES

BACKGROUND OF THE INVENTION

The present application relates to systems for hanging or otherwise supporting articles, such as flags, signs, and the like on a post or column.

There are several methods for supporting articles, such as flags and signs in the art. For example, a simple tubular receiver may be screwed directly to the post. This, unfortunately, requires tools and damages the post to which the receiver is attached. There are other systems that do not require the supporting structure to be affixed to the post, such as those disclosed in U.S. Pat. Nos. 1,666,293, 2,086,280, 2,774,562, 2,801,851, 3,064,933, 4,415,137, 4,524,542, 4,534,129, and 4,908,982, and US Pub. No. 20030132355, which are incorporated herein by reference. These, however, have several limitations, including still requiring some assembly to the post. Accordingly, there is a need for supporting system that are easily and quickly attached or attachable to a post, without the need for screws or tools.

SUMMARY OF THE INVENTION

A support system is provided that includes: a tubular receiving member; first and second intermediate braces extending outward from a bottom end of the tubular receiving member in different directions in a first plane; a first vertical support extending from the first intermediate brace in a direction essentially orthogonal to the first plane; a second vertical support extending from the second intermediate brace in a direction essentially orthogonal to the first plane and opposite the first intermediate brace; an upper brace extending from the first vertical support; and a lower brace extending from the second vertical support, each of the braces in a second plane essentially parallel to the first plane and forming a hooks with opening in opposite directions from each other.

In at least one embodiment, the support member is angled relative to a plum line that is essentially perpendicular to the first plane.

In at least one embodiment, the support member is angled between 0 and 90 degrees relative to the plum line.

In at least one embodiment, the first and second members have a curved shape to accommodate a circular post.

In at least one embodiment, the first and second members have a right-angled shape to accommodate a square or rectangular post.

6. In at least one embodiment, the first and second members extend in directions opposite each other.

In at least one embodiment, each of the upper and lower braces has a semi-circular shape.

In at least one embodiment, each of the upper and lower braces has a right-angled shape.

In at least one embodiment, the upper brace has an opening facing the tubular support member and lower brace has an opening facing a direction opposite the tubular member.

DETAILED DESCRIPTION OF THE INVENTION

Figure 1:
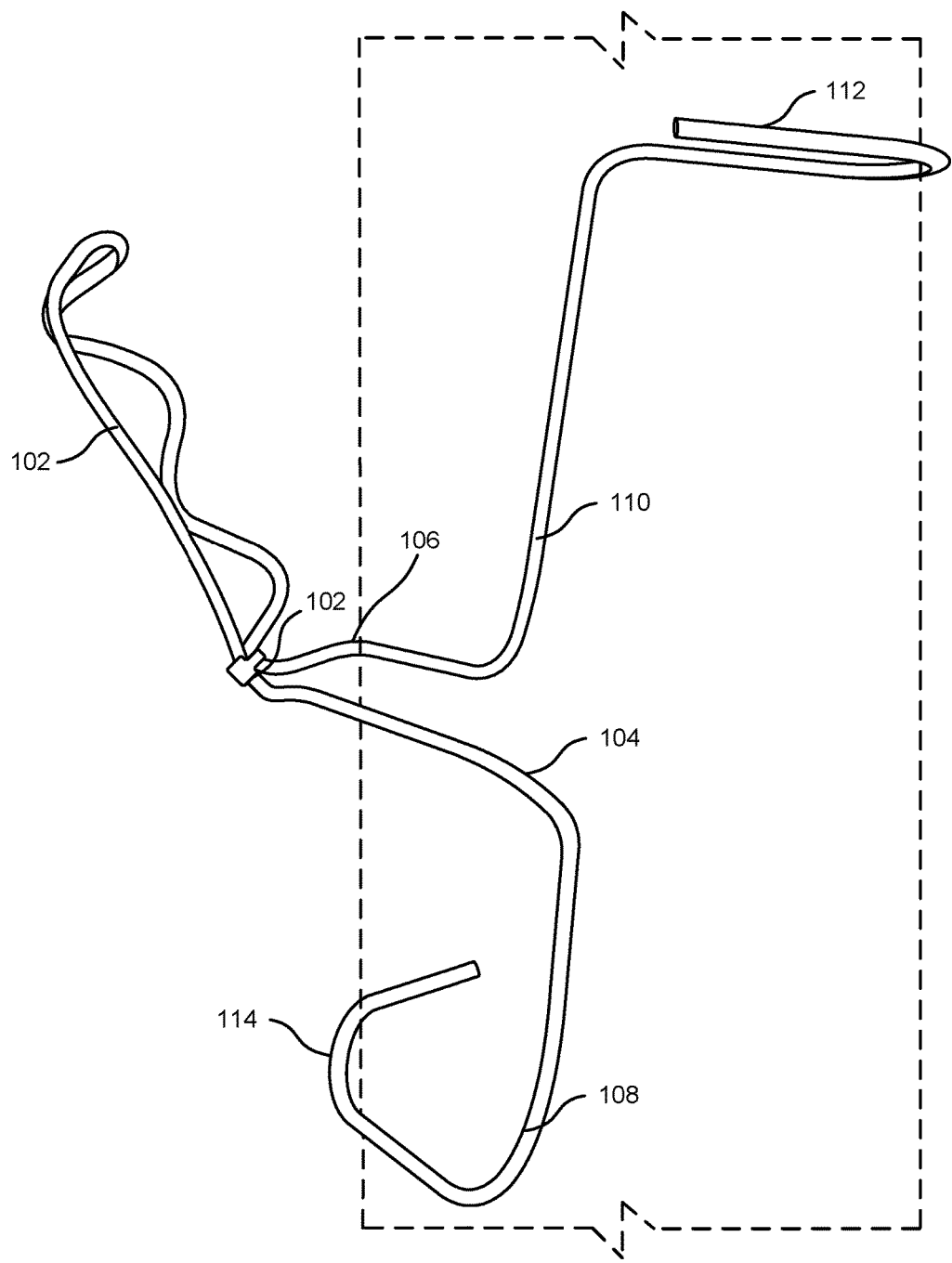
FIG. 1 is a left side view for a screwless support system according to one embodiment of the supports disclosed herein.
Figure 2:
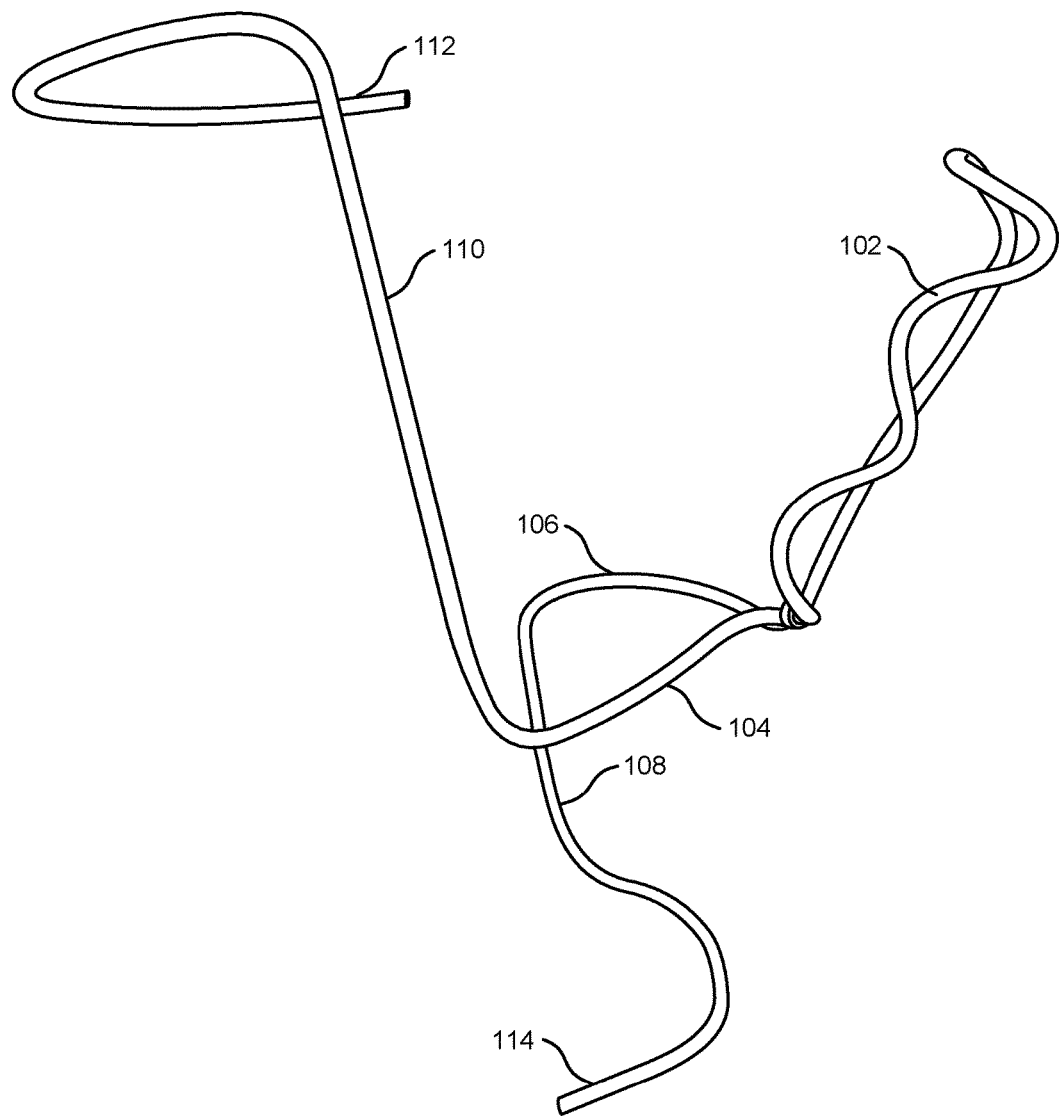
FIG. 2 is a right side view for a screwless support system according to one embodiment of the supports disclosed herein.
Figure 3:
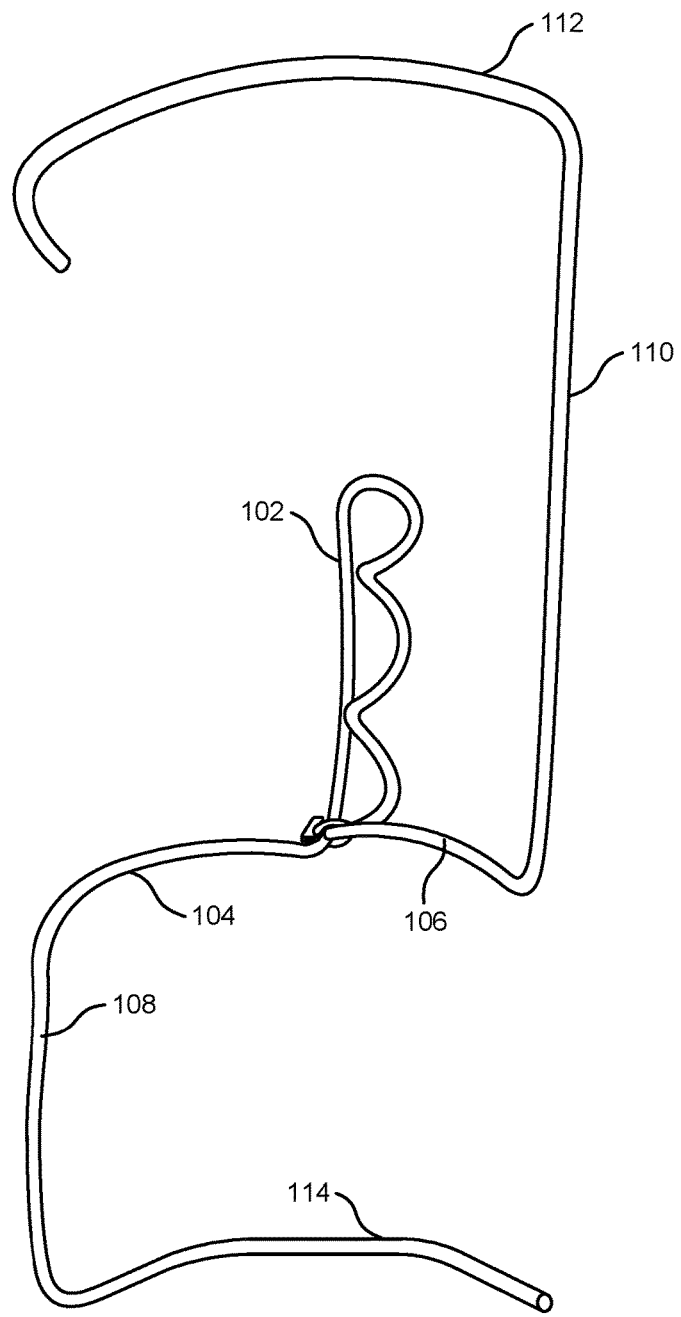
FIG. 3 is a rear view for a screwless support system according to one embodiment of the supports disclosed herein.
Figure 4:
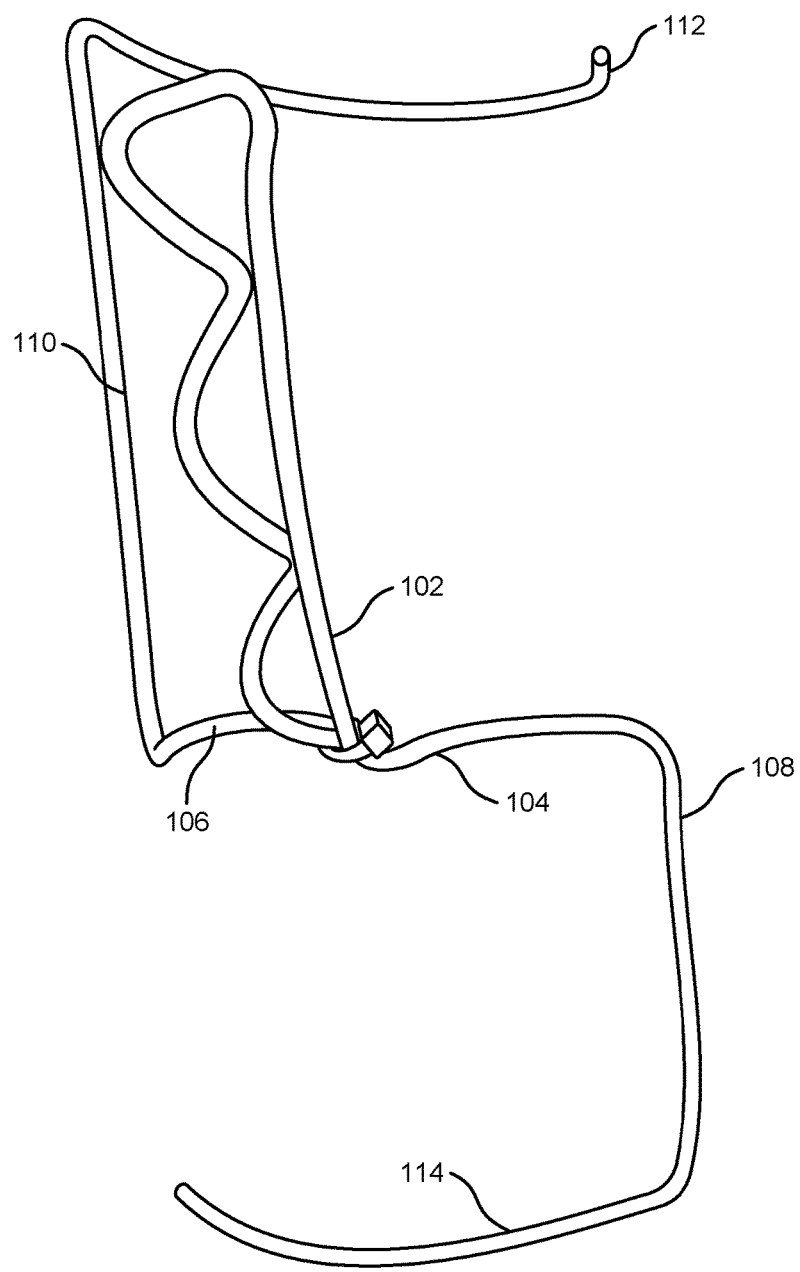
FIG. 4 is a front view for a screwless support system according to one embodiment of the supports disclosed herein.
Figure 5:
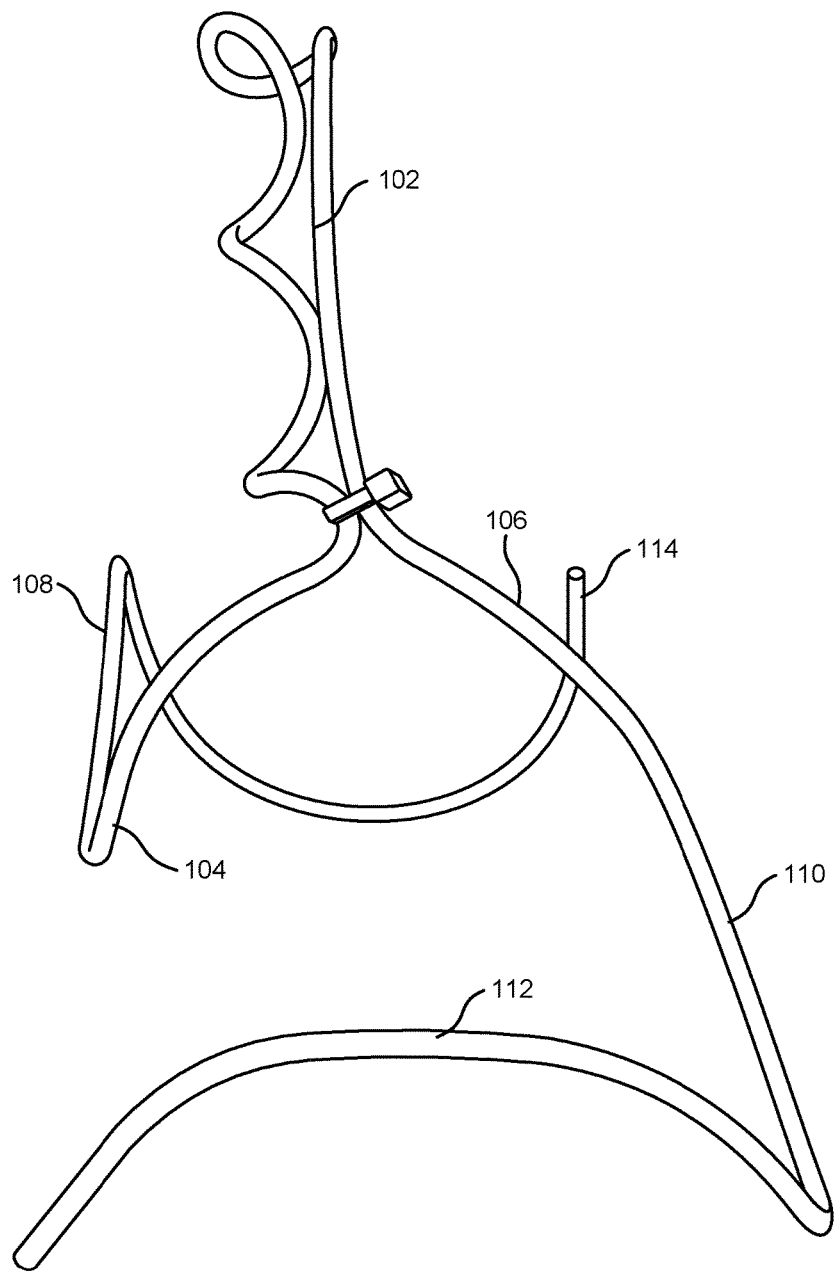
FIG. 5 is a bottom view for a screwless support system according to one embodiment of the supports disclosed herein.
Figure 6:
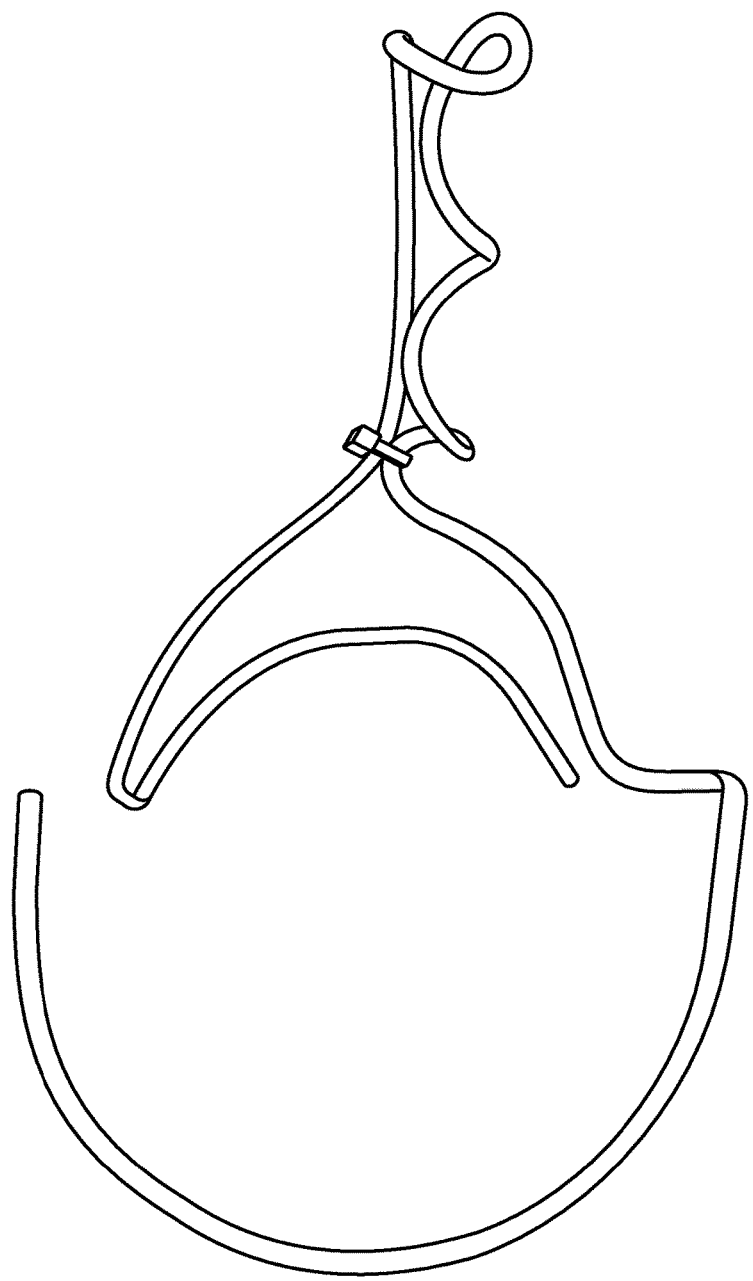
FIG. 6 is a top view for a screwless support system according to one embodiment of the supports disclosed herein.

Referring to FIGS. 1-8, the supporting system or apparatus includes a tubular receiving member 102. The tubular receiving member is shown angled relative to a reference plumb line (i.e., vertical line relative to the intermediate member plane). This orientation, for example, accommodates a flag. It is understood that this orientation maybe anywhere between 90 degrees or less relative to the plumb line, i.e., essentially horizontal to essentially vertical. The tubular receiving member 102 is further shown made from a continuous wire bent into the tubular shape. It is understood that the tubular receiving member may be made in any other manner, including a hollow tube with a continuous structure. Extending from the tubular receiving member 102 are a first and a second intermediate braces 104, 106. The first and second intermediate braces generally extend laterally out from the tubular member in a plane that is perpendicular to the plumb line. The first brace extends in a first direction while the second extends in a second direction, which initially is opposite the first direction. In one embodiment, the braces are designed to fit around a circular post. In this instance, the first and second intermediate braces extend outward to form a semicircular shape, as shown. The intermediate braces may also be formed to fit around a square or rectangular post. In this instance, the intermediate braces 104, 106 may extend outward from the tubular member 102 in opposite directs, followed by essentially 90-degree bends to mimic the corners of the post.

Extending out from each end of the intermediate brace 104, 106 is a vertical support 108, 110. That is, a first vertical support 108 extends from the end of the first brace 104 and a second vertical support 110 extends from the end of the second brace 106. The first and second vertical supports extend vertically in opposite directions (with reference to the plumb line). Finally, from each vertical support extends into an upper brace and a lower brace 112, 114. The upper and lower braces extend from the vertical supports in a plane essentially perpendicular to the plumb line. Importantly, the upper brace 112 forms a hook with an opening facing a direction opposite of that of the lower and intermediate braces 104,106, 114. In one embodiment, the top hook opens inward toward the receiving member 102 while the bottom hook opens outward away from the receiving member 102. As shown, the upper and lower braces are designed for a circular post and therefore have a semi-circular shape. Other shapes may be used for posts with difference cross sectional shapes.

In operation, the apparatus is oriented so that the vertical supports 108 and 110 are essentially horizontal. In this orientation, the apparatus can receive the post to which the apparatus will be removably attached thereto between the upper brace 112 and the intermediate braces 104, 106. Once in proximity to the post, the apparatus may be reoriented until the vertical supports are placed into the vertical orientation with the post situated within the hooks created with the upper, lower, and intermediate braces. The upper brace engages the post to prevent the apparatus from falling forward, while the lower braces engage the post lower on the post. Removal is accomplished by repeating these steps in the reverse order. In this regard, the apparatus is removably attachable to the post without any tools or screws. The apparatus may further include a band or other mechanism for securely strapping the apparatus to the post, for example, for additional protection against wind and theft.

While the foregoing invention has been described in some detail for purposes of clarity and understanding, it will be appreciated by one skilled in the art, from a reading of the disclosure, that various changes in form and detail can be made without departing from the true scope of the invention.

The invention claimed is:

1. A support system for supporting an article on a vertical column comprising:
   a tubular receiving member;
   first and second intermediate braces extending outward from a bottom end of the tubular receiving member in different directions in a first plane, wherein when the support system is placed on the column the first plane is horizontal relative to the column and wherein the first and second intermediate braces form a concave shape that partially surrounds the column;
   a first vertical support extending from the first intermediate brace in a direction vertical relative to the first plane when the support system is placed on the column;
   a second vertical support extending from the second intermediate brace in a direction vertical relative to the first plane and opposite the first intermediate brace, and vertically below the first and second intermediate braces;
   an upper brace extending from an end of the first vertical support and having a concave shape that partially surrounds the column; and
   a lower brace extending from an end of the second vertical support and having a concave shape that partially surrounds the column, each of the braces in a horizontal plane and with the concave shapes having openings in opposite directions from each other to retain the support system against the column.

2. The support system of claim 1, wherein the support member is angled relative to a plum line that is essentially perpendicular to the first plane.

3. The support system of claim 2, wherein the support member is angled between 0 and 90 degrees relative to the plum line.

4. The support system of claim 1, wherein the first and second members have a curved shape to accommodate a circular post.

5. The support system of claim 1, wherein first and second members have a right-angled shape to accommodate a square or rectangular post.

6. The support system of claim 1, wherein the first and second members extend in directions opposite each other.

7. The support system of claim 1, wherein each of the upper and lower braces has a semi-circular shape.

8. The support system of claim 1, wherein each of the upper and lower braces has a right angled shape.

9. The support system of claim 1, wherein the upper brace has an opening facing the tubular support member and lower brace has an opening facing a direction opposite the tubular member.

* * * * *